June 16, 1925.

L. BERZON

ICE CREAM CONE BAKING MACHINE

Filed Feb. 21, 1923

1,541,893

WITNESS:
Rob R Kitchel.

INVENTOR
Louis Berzon
BY
Frank S. Busser
ATTORNEY.

Patented June 16, 1925.

1,541,893

UNITED STATES PATENT OFFICE.

LOUIS BERZON, OF PHILADELPHIA, PENNSYLVANIA, ASSIGNOR, BY DIRECT AND MESNE ASSIGNMENTS, TO PHILADELPHIA ICE CREAM CONE MACHINERY COMPANY, A CORPORATION OF PENNSYLVANIA.

ICE-CREAM-CONE-BAKING MACHINE.

Application filed February 21, 1923. Serial No. 620,333.

*To all whom it may concern:*

Be it known that I, LOUIS BERZON, a citizen of the United States, residing at Philadelphia, county of Philadelphia, and State of Pennsylvania, have invented new and useful Improvements in Ice-Cream-Cone-Baking Machines, of which the following is a full, clear, and exact description, reference being had to the accompanying drawings, which form a part of this specification.

My invention relates to an improvement in ice cream cone baking machines and more especially to that type adapted to be operated by hand.

In ice cream cone baking machines of the hand operated type, for example, such as is shown and described in the United States Patent No. 1,432,049, dated October 17, 1922, to Louis Berzon and Joseph Brezin, the female mold members are mounted in pairs the adjacent sections of the molds of each pair being spaced apart when in baking position and means being provided for lifting the molds above the spacer in order to permit separation of the sections of each mold for the more ready removal of the baked cones.

The raising of the female molds has heretofore been effected by means of cams carried by a cam rod which extends lengthwise beneath the female mold members and an extension of which is provided with a handle for manual operation.

Such a device has been found satisfactory and effiecient for the purpose, but is open to the objection that the cam rod interferes with the direct action of the heating flame on the molds, both by the absorption of heat and by interference with the flame, with the result that the baking of the cones is not always uniform.

Now the object of my invention is to provide improved means for lifting the female mold members, which will operate efficiently and at the same time will in no wise interfere with the proper functioning of the other elements of the machine.

Having now indicated in a general way the nature, purpose and advantages of my invention, I will proceed to describe a preferred embodiment thereof in detail, with reference to the accompanying drawings in which—

Figure 1:
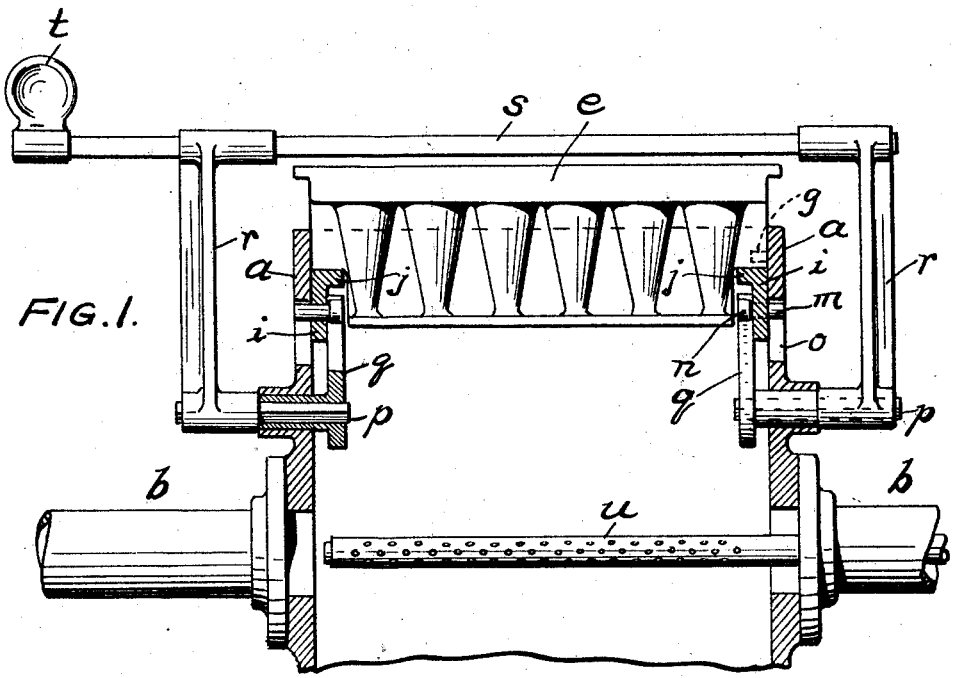
Fig. 1 is a fragmentary view, partly in section, of an ice cream cone baking machine, embodying my invention.
Figure 2:
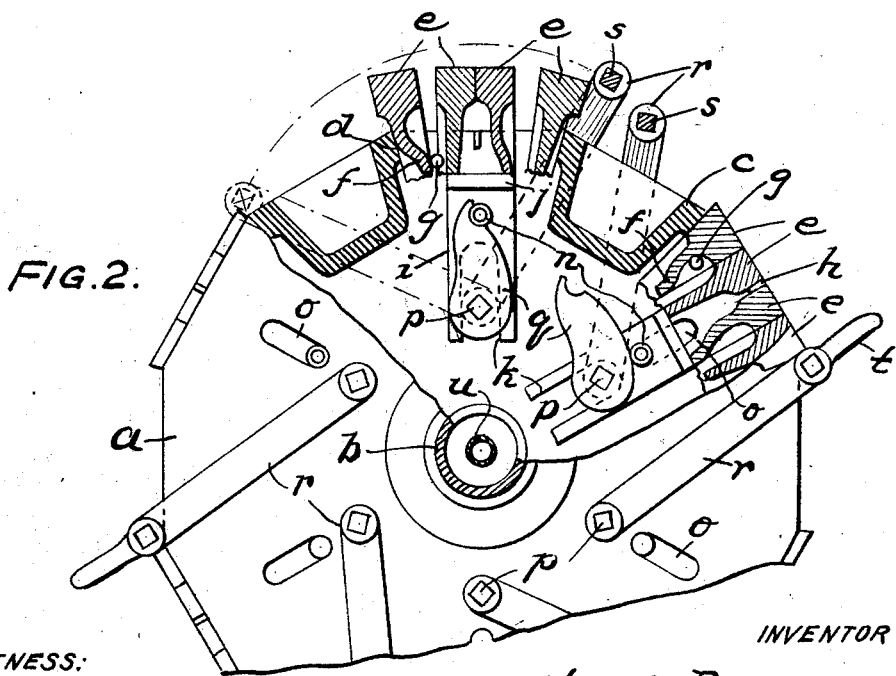
Fig. 2 is a fragmentary view, partly in section, showing a detail of the machine shown in Fig. 1.

The machine illustrated comprises a pair of polygonal frame members $a$, $a'$ secured to the end shafts $b$, $b'$ which are suitably supported in bearings. Between the frame members are supported hollow spacing blocks $c$, having beveled lips $d$ adjacent their upper edges and between which the female mold members $e$ are supported in pairs.

The female mold members $e$ are made in two sections pivotally secured together. The ends of the mold members are provided with ears $f$ between which extend pins $g$ secured in the frame members $a$, $a'$. The female mold members are supported, between spacing blocks $c$, in pairs, the pairs being secured together at the bottom by means of flat springs and the upper edges of adjacent sections of each pair are separated by means of a separating strip $h$.

Against each end of each pair of female mold members is placed a casting $i$, having a flange $j$ at its upper end and provided with a cut-out portion $k$ above which is drilled a hole through which is threaded a stud $m$ upon which is carried a roller $n$.

The castings $i$ at each end of the pair of female mold members are positioned so that flange $j$ bears against the lower end of ears $f$ and are supported by stud $m$, which passes through the hole $l$ in the casting and extends through radially extending slots $o$ in the frame members $a$, $a'$.

Shafts $p$, $p$ extend through the frame members below the pairs of female molds and carry on their ends cams $q$, $q$ which are so positioned as to act on rollers $n$. Connected to shafts $p$, $p$ are upwardly extending cranks $r$, $r$, the upper ends of which are connected together by means of a rod $s$ extending over the top of the mold members and having an extension of one end provided with a handle $t$.

Extending through shaft $b'$ and between frame $a$, $a'$ is a burner $u$ adapted to heat the female molds and as will be appreciated the machine is provided with suitable cores or male molds members, not shown.

In operation: After the cones are baked and the cores or male mold members are lifted out, as is customary in such machines, the cranks $r$, $r$ are turned by means of the handle $t$, thus turning the cams $q$, $q$ and causing the pairs of mold members $e$ to be raised above the separating strip $h$ and the beveled edges of the spacing blocks $o$, through the lifting action of the cams on castings $i$, in order that adjacent sections of the molds may be moved together to free the cones and permit their ready removal.

It will now be observed that by virtue of my invention the mechanism for operating the lifting cams is without the frames $a$, $a'$ and the connections between the operating handle and the cams are above the mold members, thus eliminating any interference with the direct and uninterrupted application of heat from the burner to the mold members.

Having now fully described my invention, what I claim and desire to protect by Letters Patent is:

1. In an ice cream cone baking machine, the combination with a frame, female mold members supported by said frame, a pair of cams pivotally supported by said frame and adapted to be actuated to lift said mold members, a pair of cranks positioned outside of the frame and operatively connected to said cams, and means affording a connection between said cranks whereby they may be operated simultaneously.

2. In an ice cream cone baking machine, the combination with a frame, female mold members supported by said frame, a pair of cams pivotally supported by said frame and adapted to be actuated to lift said mold members, a pair of cranks in operative connection with said cams and extending above said mold members, and a rod connecting said cranks whereby said cranks may be rotated simultaneously.

3. In an ice cream cone baking machine, the combination with a pair of frame members, spacing blocks supported by said members, female mold members supported by said spacing blocks, a cam pivotally supported by each of said frame members adjacent the ends of said mold members, a crank in operative connection with each of said cams and extending above said mold members, and a rod extending above said mold members and affording a connection between said cranks whereby said cranks may be operated to operate said cams simultaneously to lift said mold members.

In testimony of which invention, I have hereunto set my hand, at Philadelphia, Pa., on this 19th day of February, 1923.

LOUIS BERZON.